United States Patent [19]

Gulati et al.

[11] 4,268,134
[45] May 19, 1981

[54] LIGHTWEIGHT LAMINATED PHOTOCHROMIC LENSES

[75] Inventors: Suresh T. Gulati, Elmira; Norman A. Smith, Corning; Anton A. Spycher, Big Flats, all of N.Y.

[73] Assignee: Corning Glass Works, Corning, N.Y.

[21] Appl. No.: 18,107

[22] Filed: Mar. 7, 1979

[51] Int. Cl.³ .............................................. G02C 7/10
[52] U.S. Cl. .............................. 351/163; 65/DIG. 2; 351/166
[58] Field of Search .............. 351/159, 163, 165, 166; 65/DIG. 2

[56] References Cited

U.S. PATENT DOCUMENTS 2,263,249 11/1941 Rogers ............................ 351/163 X
3,833,289 9/1974 Schuler ........................... 351/166 X
4,168,339 9/1979 Kerko et al. .................... 351/163 X

OTHER PUBLICATIONS

Pirog, J., "Reducing the Shrinkage of Resins During Curing", *IBM Technical Disclosure Bulletin*, vol. 12, No. 4, p. 594, 9/1969.

*Primary Examiner*—John K. Corbin
*Assistant Examiner*—Scott J. Sugarman
*Attorney, Agent, or Firm*—Kees van der Sterre; Clinton S. Janes, Jr.

[57] ABSTRACT

A photochromic glass/plastic laminated lens of improved physical durability comprising a buried layer of photochromic glass, surface layers of optically clear plastic, and adhesive bonding layers of high strength but low elastic modulus between the buried glass and plastic surface layers, is described.

8 Claims, 5 Drawing Figures

LIGHTWEIGHT LAMINATED PHOTOCHROMIC LENSES

BACKGROUND OF THE INVENTION

The present invention is in the field of glass-plastic laminates, and particularly relates to the production of curved glass-plastic laminated lenses exhibiting good photochromic properties.

Photochromic glasses are glasses which darken on exposure to visible or ultraviolet light and return to the clear state in the absence of such light. Examples of photochromic glasses are shown in U.S. Pat. No. 3,208,860 to Armistead et at. Photochromic glasses have been used to fabricate ophthalmic and sunglass lenses which provide automatic darkening under bright lighting conditions.

Plastic ophthalmic lenses have an advantage over glass lenses in that they are relatively light in weight. However, to date no plastic material exhibiting reversible photochromic behavior which is free from fatigue (i.e., gradual loss of photochromic properties upon repeated use) has been developed.

It has previously been proposed to combine the desirable properties of photochromic glasses and plastics in glass-plastic laminated articles wherein photochromic glass would impart the desired fatigue-free photochromic behavior. Hence, published German Pat. application No. 1,284,588 suggests a variety of ways in which the desirable properties of photochromic glasses and plastics could be combined. A technique for bonding glass to high shrinkage allyl diglycol carbonate plastics is described in the copending commonly assigned application of A.A. Spycher, Ser. No. 27,231, filed Apr. 5, 1979 now U.S. Pat. No. 4,227,950, a continuation of Ser. No. 848,942, filed Nov. 4, 1977 now U.S. Pat. No. 4,168,068. Nevertheless, there is at present no commercially successful product wherein a satisfactory combination of photochromic glass and plastic has been achieved.

The absence of any commercially successful product in this field can be attributed to the difficulty of providing a laminate exhibiting the essential properties of optical clarity, acceptable photochromic response, and, most importantly, the mechanical durability necessary to enable the composite to retain its physical integrity under the adverse conditions of use. Concerning the problem of mechanical durability, the coefficient of expansion of most glasses falls within the range below about $9 \times 10^{-6}/°$ C., while that of commercially available allyl diglycol cargbonate resins presently used for plastic ophthalmic lenses is on the order of $100 \times 10^{-6}/°$ C. This expansion mismatch readily causes stresses which induce glass layer fracture or glass-plastic delamination in a glass-plastic composite article even as it is cooled to room temperature after processing. Because of this mismatch, the production of a laminated lens which can withstand reasonable temperature excursions (e.g., from about $-40$ to about $100°$ C.) in use is extremely difficult.

SUMMARY OF THE INVENTION

In accordance with the present invention, a configuration for a curved glass-plastic laminated lens which exhibits improved physical stability under use conditions is provided. This is a configuration in which bending stresses due to the glass-plastic expansion mismatch are minimized or eliminated, and meridianal stresses are reduced.

Bending stresses arising from the thermal expansion mismatch are minimized by positioning the glass layer of the curved laminate at a buried position between plastic front and back surface layers where the bending moments applied to the glass layer by the plastic layers are at least partly balanced. In this way, a reduced net bending moment at the lens edge may be realized and thus the tensile stresses which cause circumferential glass core fracture near the lens edge may be essentially eliminated.

Meridianal stresses arising due to the glass-plastic expansion mismatch are minimized through the use of special bonding layers between the centralized glass layer or core and each of the plastic surface layers. These are bonding layers which exhibit high shear and tensile strength, yet possess a relatively low modulus of elasticity.

Through the use of such bonding layers, relief from high meridianal stresses can be obtained, and a lens which can withstand high and low use temperatures without core fracture is provided.

BRIEF DESCRIPTION OF THE DRAWINGS

The invention may be further understood by reference to the drawings wherein.

DETAILED DESCRIPTION

As is well known, glass exhibits high resistance to fracture under a compressive stress, but relatively low resistance to fracture under a tensile stress. The principal problem in the manufacture of a glass-plastic laminated composite is that, due to the large difference in thermal expansion between glass and most plastics, it is difficult to design a composite article wherein the glass component would not be subjected to tensile stress on at least some portion of its exterior surface. The analysis of this problem is complicated in the case of a lens for ophthalmic or sunglass use, due to the spherical surface shape required in such a lens.

Figure 1:
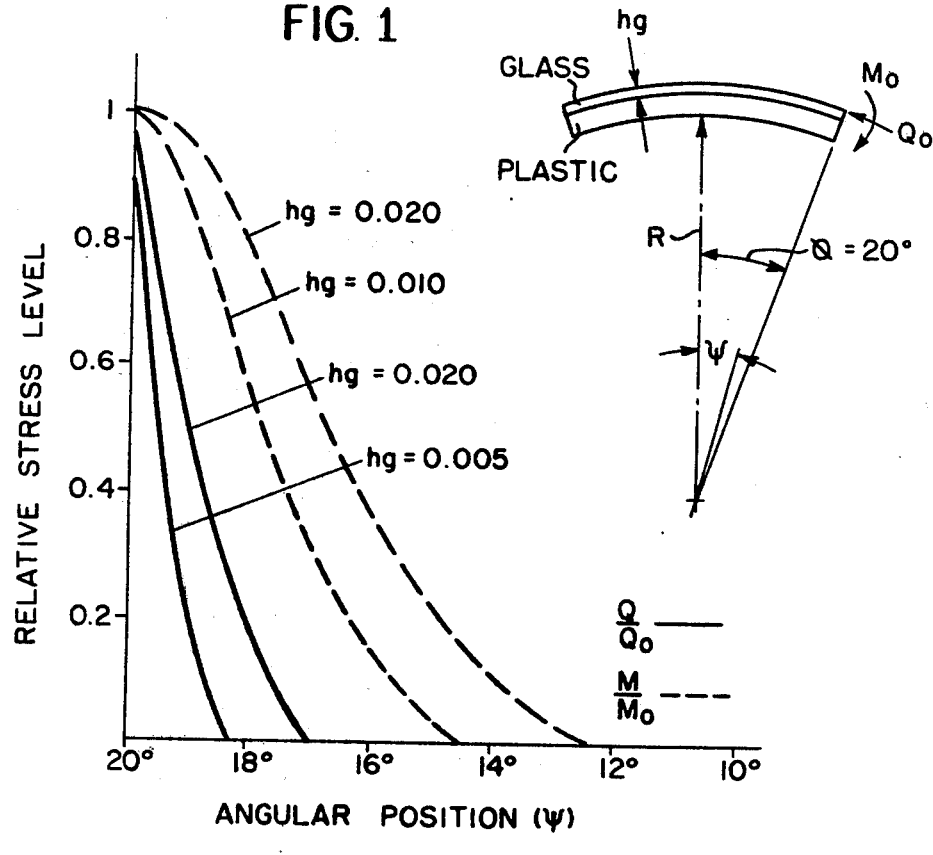
FIG. 1 is a schematic illustration in cross section of a curved laminated article comprising a glass front surface layer and a plastic back surface layer, showing the nature of the stresses arising in such a laminated article by virtue of the difference in thermal expansion between plastic and glass.

The stresses arising in a curved glass-plastic laminated lens may be analyzed in terms of a spherical shell theory such as propounded by S. P. Timoshenko and S. Woinowsky-Krieger in their Theory of Plates and Shells, 2nd Edition, pages 547-551, McGraw-Hill, New York (1959). Referring to FIG. 1 of the drawing, the analysis shows that at the edge of a curved laminated lens comprising both glass and plastic members, a meridianal force $Q_o$ and a bending moment $M_o$ develop in the glass layer. The bending moment tends to bend and fracture a glass layer near the lens edge by cracking which propagates circumferentially, beginning from the exposed surface of the glass towards the underlying plastic. The meridianal force tends to place the glass element under compression, and so does not tend to cause glass layer breakage in the configuration shown.

The analysis further shows that both the bending moment and the meridianal force decay rapidly with increasing distance from the edge of the lens, according to the following equations:

$$Q/Q_o = -\sqrt{2}\tan\phi \cot\Psi e^{-\lambda(\phi-\Psi)}\sin[\lambda(\Phi-\Psi)-\pi/4]$$

$$M/M_o = \sqrt{2}e^{-\lambda(\phi-\Psi)}\sin[\lambda(\phi-\Psi)+\pi/4]$$

wherein $Q_o$ and $M_o$ are, respectively, the meridianal force and the bending moment at the lens edge, Q and M are the meridianal force and the bending moment at a distance from the lens edge determined by the angle $\Psi$, $\phi$ is the entire angle encompassed by the spherical section of the lens, and $\lambda$ is a numerical factor which depends upon the thickness of the glass layer ($h_g$), the Poisson's ratio of glass ($\nu$), and the radius of curvature of the lens (R) according to the following equation:

$$\lambda^4 = 3(1-\nu^2)(R^2/h_g^2)$$

Referring again to FIG. 1 of the drawing, the decay of the bending moment and meridianal force is shown by the plots of relative stress level as a function of angular position or distance from the lens edge for the case of a curved laminated lens, $Q/Q_O$ being the relative meridianal force and $M/M_O$ being the relative bending moment. The curved lens has glass front surface layer of thickness ($h_g$), a rigid plastic back surface layer of thickness 0.080 inches, to which the glass front surface layer is bonded, a radius of curvature R, and an encompassed angle of 20°. It is evident from these plots that both the meridianal force and bending moment decrease rapidly with increasing distance from the lens edge, and that the relative magnitudes of those forces are smaller for a thin glass layer than for a thick glass layer.

The reduction or cancellation of bending moment stresses can be achieved in a curved laminated lens by positioning a glass core layer at a buried position between the front and back plastic surface layers of the lens, at least near the edges of the lens. A desirable configuration for achieving this effect is a curved laminated lens having a plastic front surface layer and a plastic back surface layer, these surface layers being bonded to opposing faces of the glass core layer, wherein the ratio of the thickness of the plastic front surface layer to the thickness of the plastic back surface layer is in the range of about 1:8 to 8:1, at least near the edges of the lens. Because the magnitudes of the opposing bending moment stresses decay rapidly with distance from the lens edge, it is sufficient if this thickness relationship between the front and back plastic surface layers is maintained at all peripheral portions of the lens with about 2 lens thicknesses of the lens edge. Preferably the ratio of front surface layer to back surface layer thickness will be in the range of 1:8 to 1:1.

The position of the glass core layer at lens positions near the center of the lens is not critical, and can be adjusted as desired. However, since the decay of bending moment stresses is less rapid for thick glass cores than for thin cores, it is desirable that the thickness of the glass core not exceed about 0.025 inches. Preferably, the thickness of the core will fall in the range of about 0.010–0.020 inches.

The foregoing considerations are applicable to lenses over a rather wide range of curvatures, so that curvature is not a critical factor which must be controlled to obtain high physical durability. However, typical curvatures for ophthalmic lens applications will normally lie in the range of about 6–8 diopters In addition to the physical advantages attending the use of buried glass core layers as above described, the buried core configuration also provides optical advantages if the refractive index of glass core is matched with that of the plastic surface layers. In that case, a relatively low degree of surface perfection is required in the glass core layer because the surfaces of that core, being buried in plastic of the same refractive index, are not refracting surfaces in the lens. This optical advantage can be of critical importance if it is desired to utilize drawn sheet glass, rather than ground and polished sheet glass, for the lens core. It is extremely difficult to fabricate a lightweight laminated lens utilizing drawn sheet glass unless the glass sheet is buried in plastic, because the surfaces of this drawn sheet are not sufficiently flat, and will cause unacceptable lens distortion if used on a lens surface.

Figure 2:
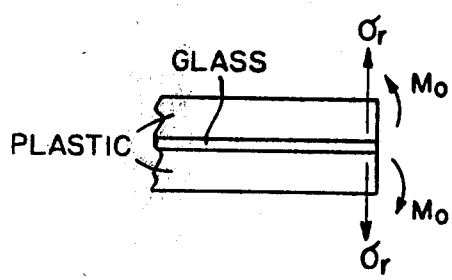
FIG. 2 is a schematic illustration in cross section of a glass-plastic laminated article comprising a central glass core and plastic front and back surface layers, illustrating the forces which give rise to bond stress therein.
Figure 2A:
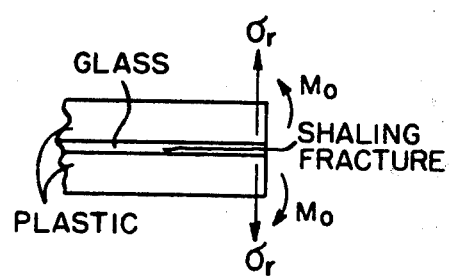
FIG. 2a is a schematic illustration in cross section of the glass-plastic laminated article of FIG. 2 after partial shaling fracture thereof due to bond stress.

Although the positioning of the glass core at a buried position within a curved glass-plastic laminated lens can result in a near-zero net bending moment against the core member, the high meridianal forces present as a consequence of the glass-plastic expansion mismatch can still induce lens failure by a mechanism referred to as shaling fracture. As shown in FIG. 2 of the drawing, shrinkage of the plastic surface layers of a glass plastic laminate comprising buried glass gives rise to opposing bending moments M, which moments have the effect of applying tensile stresses $\sigma_r$ perpendicular to the bonded surfaces of the glass core member at the exposed edge. As the forces in the laminate increase, for example by further contraction of the plastic surface layers at low temperatures, the stresses $\sigma_r$, referred to as bond stresses, can increase to a level where lens failure will occur by shaling fracture of the glass core. The mode of propagation of such shaling fracture is illustrated in FIG. 2a of the drawing.

In cases where the lens surface layers expand rather than contract as the result of high lens temperatures, the meridianal forces applied to the glass core by the plastic surface layers are opposite in direction from the forces shown in FIG. 2. As a consequence of these forces, a circumferential hoop stress is generated in the glass core which can also cause core failure if not controlled.

To reduce bond stress and hoop stress at extreme temperatures in curved glass-plastic laminated lenses, we employ adhesive bonding layers between the glass core and the plastic front and back surface layers which reduce the meridianal forces applied to the glass core. Specifically we employ adhesive bonding layers which include an adhesive having a tensile strength of at least about 4000 psi, a shear strength of at least about 2000 psi, and which have a thickness of at least about 0.002 inches, preferably at least about 0.005 inches, wherein the elastic modulus does not exceed about 10,000 psi.

Figure 4:
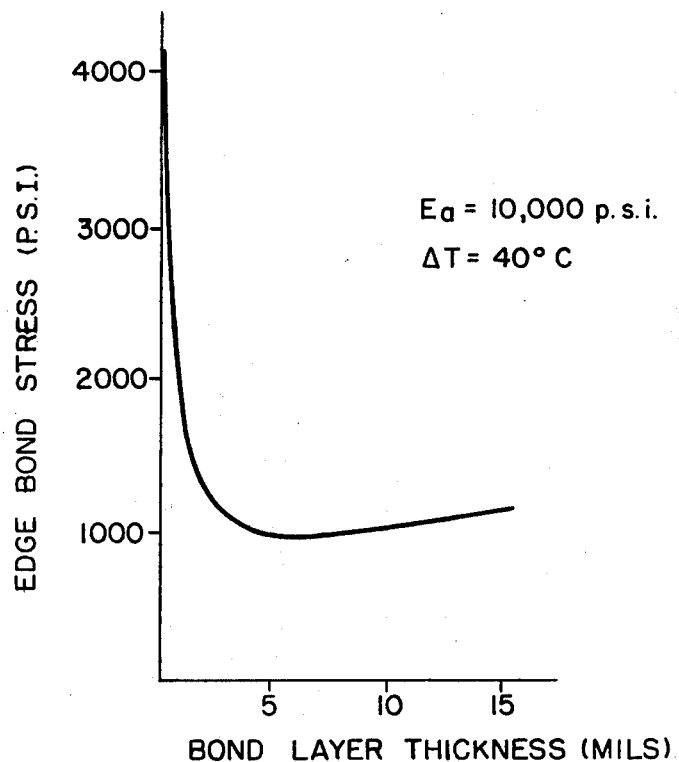
FIG. 4 is a graph of the bond stress exerted at the edge of a glass core element as a function of bonding layer thickness for a bonding layer material having a low elastic modulus.

The effect of such a bonding layer on the bond stress applied to the glass core is illustrated in the graph constituting FIG. 4 of the drawing. That graph plots bond stress at a glass/adhesive interface near the exposed glass edge as a function of the thickness of the adhesive bonding layer, for the case of an adhesive material having an elastic modulus ($E_a$) equal to about 10,000 psi. The stresses shown arise as the result of cooling the laminated lens about 40° C. from the temperature at which the laminate is stressfree. The bond stress of more than 4000 psi shown for the case of a hypothetical zero-thickness bonding layer is normally sufficient to cause shaling fracture of a conventionally manufactured glass core element, since such an element typically includes at least some edge flaws which limit glass strength.

Of course, in addition to the physical properties necessary for mechanical durability as above described, the adhesive bonding layers to be used in these lenses must exhibit good optical clarity, characterized by low haze and minimum light absorption throughout the visible range. Preferably the adhesive will also exhibit low ultraviolet absorption to permit effective darkening of the photochromic glass core of the lens, and will have a refractive index in the range of about 1.46–1.54 to enhance the optical properties of the lens.

Chemically, the adhesive must exhibit sufficient interaction with the glass core and plastic surface layers of the lens to provide good bonding therebetween, but must not degrade the optical properties of the plastic or interact with the plastic in such a way as to affect its own elasticity or strength.

Control over these chemical interactions is particularly difficult when the lens is to be produced by direct casting of a liquid resin against the glass core to form the plastic surface layers. In many cases, chemical interactions with liquid resins have the effect of hardening or embrittling the adhesive bonding layers in a manner which increases the elastic modulus thereof. To preserve the necessary thickness of low elastic modulus material in such cases, a thicker layer of adhesive may be initially applied, or a barrier layer may be provided between the adhesive bonding layer and the curing plastic surface layers of the lens. In this way a lamina or laminar region at least about 0.002 inches in thickness within the layer wherein the elastic modulus does not exceed 10,000 psi can be preserved.

Particular adhesives which can exhibit the chemical and mechanical properties necessary for the production of a mechanically durable lens may be identified by routine experiment. In general, polyurethane adhesives are the most likely to provide the necessary chemical and physical properties for use in curved laminated lens systems. However, other adhesives, including certain of the highly plasticized polyvinyl butyrals, may be alternatively employed, provided that they exhibit the high strength and low elastic modulus necessary to relieve the hoop and bond stresses which are thermally generated in a glass-plastic laminated lens system.

The glass core of a laminated lens provided according to the invention may be composed of any photochromic glass exhibiting sufficient darkenability in thin cross-section for the intended lens use. Normally the cross section of the photochromic core will be in the range of about 10–20 mils; thus highly darkening photochromic glasses are preferred. Examples of photochromic glasses which are useful for these applications are the microsheet photochromic glasses described by D.J. Kerko et al. in U.S. Pat. application Ser. No. 927,956, filed July 26, 1978, now U.S. Pat. No. 4,168,339 and commonly assigned herewith. This copending application is expressly incorporated herein by reference for a further description of such photochromic microsheet, and the processes by which it may be manufactured.

The plastic front and back surface layers of laminated lenses provided according to the invention are preferably composed of an allyl diglycol carbonate resin of the kind presently used for fabricating plastic ophthalmic lenses. The most widely used resin for this application is diethylene glycol bis(allyl carbonate) resin, commercially available as CR-39 ® resin. This resin exhibits good optical clarity, is light in weight, and is also moderately scratch resistant.

Although it is possible to provide laminated ophthalmic lenses using precast plastic front and back surface layers to which are adhesively bonded the curved photochromic glass core element, such an approach would require substantially higher manufacturing costs than a direct casting method. Accordingly, our preferred procedure for providing a laminated glass-plastic lens is to apply adhesive bonding layers to the opposing surfaces of a selected curved photochromic glass core element, to position the adhesive-coated core element in a molding chamber, and then to inject liquid resin into the mold and arounb the adhesive-coated glass core in the configuration of the desired lens. Finally the resin is cured by heating and the completed glass-plastic laminated lens is removed from the molding chamber.

Allyl diglycol carbonate resins of the kind presently used for ophthalmic lenses are high-shrinkage resins, shrinking approximately 14% during a conventional curing cycle. At intermediate stages of the curing, these resins are relatively weak and subject to cracking at very low applied stress. In order to avoid cracking during curing, it is helpful to utilize a curing schedule which is somewhat longer and lower in temperature than prior art curing schedules. In accordance with our preferred manufacturing method, therefor, we cure the allyl diglycol carbonate resin/glass laminated lens at a temperature not exceeding about 80° C. for a time within the range of about 14–24 hours, depending on lens thickness. This yields a crackfree product of satisfactory hardness, which also retains relatively low residual stress at room temperature due to the moderate curing temperatures employed.

The invention may be further understood by reference to the following detailed examples.

EXAMPLE 1

A photochromic coquille lens is selected for processing. This lens is a spherically curved coquille in the shape of a meniscus lens, having a front and back surface curvature of about 6 diopters, composed of photochromic microsheet glass about 0.018" in thickness which darkens to a transmittance of about 45% upon exposure to ultraviolet light at room temperature, and which fades to a transmittance of 75% after a fading interval of 5 minutes at room temperature.

The coquille is thoroughly cleaned by sequential immersion in acetone, a deionized water/detergent mixture, deionized water, and finally an isopropyl alcohol/water mixture. It is then dried and coated on both sides with a silane priming solution consisting of 1 part by volume of Hughson TS-3348-5 silane primer diluted with 3 parts by volume of toluene. The silane primer is commercially available from Hughson Chemicals, Division of Lord Corporation, Erie, Pennsylvania.

The silane-primed coquille thus provided is then coated on both sides with a polyurethane adhesive by repeated dipping into a urethane solution consisting of 50 parts by volume of Hughson RD-3493-69 urethane adhesive and 50 parts by volume of methyl ethyl ketone. The urethane adhesive is commercially available from Hughson Chemicals.

In order to apply a 0.005-inch adhesive film, the coquille is repeatedly dipped into this adhesive solution and then cured for ¼ hour at room temperature and ½ hour at 130° C., with this dipping and curing procedure being repeated four times to obtain the necessary film thickness. To assure uniform film thickness across the lens, the coquille is rotated 90° between each dip.

To provide a laminated lens using this coquille, a rubber gasket is positioned on a spherically curved 6-diopter shell mold, and a predetermined quantity of CR-39 ® resin is poured into the mold. The coquille is then positioned with its convex surface facing downward against the resin and the rubber gasket, and a second gasket is positioned on the concave surface of the coquille. A second predetermined quantity of CR-39 ® resin is then poured onto the coquille, and a second 6-diopter shell mold is placed against the coquille and rubber gasket.

Figure 3:
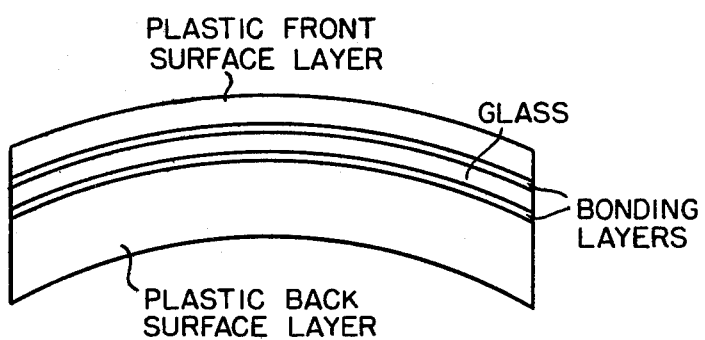
FIG. 3 is a schematic illustration in cross section of a curved glass-plastic laminated lens provided in accordance with the invention.

This lens assembly is then clamped and placed in a curing oven wherein it is slowly heated to a temperature of 80° C. over a heating interval of about 13 hours, further heated at 80° C. for an additional 3 hours, and finally cooled to room temperature. The clamped assembly is then removed from the oven, and the clamps and shell molds are removed from the glass-plastic laminate. The product of this laminating procedure, after edging to remove excess glass and plastic material from the circumferential edge of the laminate, is schematically illustrated in FIG. 3 of the drawing. That lens consists of the 0.010-inch thick glass core positioned between cured plastic front and back surface layers, the front surface layer being about 1 mm in thickness and the back surface layer being about 4 mm in thickness at the lens edge. Stress relief in the assembly is provided by the two 0.005 inch thick urethane bonding layers positioned on either side of the glass core.

The foregoing Example constitutes the presently preferred method for attaining the objectives of the present invention. A laminated lens provided in accordance with this procedure exhibits excellent optical quality and good photochromic properties, and can withstand temperature cycling from about −40° C. to about +100° C. without breaking due to thermal stress. In contrast, laminated lenses of the same configuration, but provided using adhesive bonding layers which do not possess the requisite low elastic modulus, cannot withstand temperature cycling over this temperature range.

To demonstrate the importance of adhesive selection on the properties of laminated lenses, Table I below sets forth examples of types of adhesives which typically do not provide the requisite chemical or physical properties for use according to the invention. These are adhesives which lack the proper combination of water-white clarity, high strength, and low elastic modulus, either initially or after contact with curing allyl diglycol resins.

TABLE I

| Adhesive Type | Adhesive Form | Properties in Direct-Cast Lens Configuration |
|---|---|---|
| Acrylic | pressure-sensitive sheet | hazy; delaminates from glass |
| Cross-linking acrylic | pressure-sensitive sheet | hazy; delaminates from resin |
| Modified acrylic ester | thermosetting liquid | high elastic modulus; some yellowing and delamination from cast resin |
| Cellulose acetate butyrate | thermoplastic sheet | high elastic modulus; delamination from cast resin |
| Epoxy | thermosetting liquid | high elastic modulus; bubbling at cast resin interface |
| Soft epoxy | thermosetting liquid | interaction with cast resin which prevents cure; delamination from cast resin |
| Silicone | thermosetting liquid | delamination from cast resin, from haze |

Of course, the foregoing data should not be interpreted as demonstrating that all adhesives of the types shown are inoperative in the present invention, but only that these types typically present problems of the kinds reported in the Table when incorporated in a cast glass-plastic laminated lens system. Obviously, the development of modified adhesives within the groups shown, for the purpose of avoiding such problems or for other applications, could provide materials exhibiting the necessary physical and chemical properties for the production of direct-case laminated lenses in accordance with the present invention.

Although as a class the polyurethane adhesives tend to provide good optical properties in direct-cast lenses, some screening is still required to identify adhesive formulations which exhibit high elastic modulus, either as cured or after interaction with cast resin, and also formulations which present optical problems such as haze or bubbling as the result of adhesive/cast resin chemical interactions. A procedure for identifying chemical problems is to simply cast allyl diglycol resin against a clear layer of cured adhesive, cure the resin, and evaluate the optical quality of the interface. High elastic modulus in the adhesive layer can be measured by conventional stress analysis techniques or by the thermal cycling of laminated articles. Polyurethane adhesives exhibiting good physical and optical properties in direct-cast lens systems include Hughson 3560-9, 3493-69, 3222-19, 3418-70 and 3533-35 polyurethane adhesives, all commercially available from Hughson Chemicals. Adhesives which have presented difficulties in direct-cast systems, either because of physical properties or chemical incompatibility with cast resin, are Hughson 3339-34, 3421-56, Z-398 and 2701-44 adhesives.

The following Examples illustrate techniques for using adhesives with less than optimum chemical compatibility in the manufacture of laminated lenses according to the invention.

EXAMPLE 2

A silane-primed photochromic glass coquille is produced in accordance with the procedure described in Example 1 above. This coquille is provided with adhesive bonding layers using a urethane solution consisting of 50 parts by volume of Hughson RD-2861-40 urethane and 50 parts by volume of a toluene/isopropanol mixture comprising 40 parts by volume of toluene and 60 parts by volume of isopropanol. The layers are applied and cured by dipping and heating as in Example 1.

The described urethane adhesive is of a type which exhibits significant chemical interaction with curing allyldiglycol carbonate resins, resulting in some surface hardening of adhesive bonding layers provided therefrom. In order to retain a substantial thickness of low elastic modulus material in bonding layers provided using this adhesive, the thickness of each bonding layer is increased from about 0.005 inches to about 0.008 inches. Hardening of these bonding layers by interaction with allyl diglycol carbonate resins affects only about the top 0.003 inches of the bonding layer. Thus an underlying elastic layer or laminar region about 0.005 inches in thickness is retained in each bonding layer after bonding with CR-39 ® resin.

To provide a laminated glass-plastic resin incorporating the described adhesive-coated coquille, the direct casting procedure of Example 1 is employed to form CR-39 ® resin front and back surface layers about 1 and 4 mm in thickness, respectively, on the adhesive-coated surfaces of the coquille. The resulting laminated lens exhibits good photochromic and optical properties as well as resistance to thermal breakage over a temperature range from about −40° C. to about +100° C.

EXAMPLE 3

A silane-primed photochromic glass coquille produced as described in Example 1 is selected for processing. This coquille is provided with 0.005-inch thick front and back surface adhesive bonding layers in accordance with the procedure described in Example 1, but again utilizing the Hughson RD-2861-40 urethane solution described in Example 2.

In order to prevent embrittlement of the 0.005-inch thick adhesive bonding layer by chemical interactions during casting, a barrier coat about 0.002 inches in thickness is provided on the surface of each of the adhesive bonding layers. This barrier coat is produced by dipping the adhesive-coated coquille into a solution consisting of 100 parts of Hughson Z-398 urethane resin and 5 parts by weight of Hughson 9986 catalyst, the urethane resin and the catalyst being commercially available from Hughson Chemicals. This barrier coat is cured by the same procedure used to cure the RD-2861-40 resin coating. It is then covered by a top bonding coat of the RD-2861-40 urethane solution to insure good bonding to the subsequently applied cast CR-39 ® resin. Thus a bonding layer followed by a barrier coat followed by a bonding coat is provided on each of the surfaces of the coquille.

Although the top urethane bonding coats are embrittled during the CR-39 ® resin surface layer casting and curing process, the Z-398 barrier coats effectively prevent chemical interaction between the underlying urethane adhesive bonding layers and the CR-39 ® resin as a laminated lens is cast and cured in accordance with the procedure described in Example 1. The resulting laminated lens exhibits good mechanical durability, withstanding cooling to −40° C. and heating to 100° C. without breakage due to thermal stress.

EXAMPLE 4

A glass-plastic laminated lens incorporating urethane adhesive bonding layers is produced utilizing the procedure and materials described in Example 3, except that in place of the urethane barrier coats described in that Example, polyvinyl butyral barrier coats are employed and the top polyurethane bonding coats are omitted. The polyvinyl butyral barrier coats are produced by dipping the urethanecoated coquille into a polyvinyl butyral solution consisting of 10 parts by weight of polyvinyl butyral and 0.7 parts by weight of plasticizer in 100 parts by weight of a toluene-based solvent. The polyvinyl butyral is Monsanto PVB-72 polyvinyl butyral and the plasticizer is Union Carbide 3GH plasticizer, these components being commercially available, respectively, from the Union Carbide Corporation, New York, New York, and the Monsanto Company, St. Louis, Missouri.

During the curing of the CR-39 ® resin front and back surface layers of this laminated lens, the polyvinyl butyral barrier coating is hardened due to extraction of the plasticizer from the barrier coating by the curing CR-39 ® resin. However, the underlying urethane bonding layer remains elastic, retaining an elastic modulus below about 10,000 psi, so that a laminated glass-plastic lens exhibiting good mechanical durability on exposure to thermal stresses is provided.

EXAMPLE 5

A photochromic glass coquille is cleaned and silanized as in Example 1 above, except that a silane solution consisting of 2 parts of Dow Corning Z-6032 silane in 100 parts of a methanol solvent (by volume) is used to apply the silane primer to the coquille.

A solution for providing polyvinyl butyral adhesive bonding layers is produced, consisting of 15 parts of polyvinyl butyral solids and 85 parts of solvent by weight. The solids component of this solution consists of 60 parts of Monsanto PVB-72 polyvinyl butyral resin and 40 parts of Union Carbide 3GH plasticizer by weight. The solvent consists of 70 vol. % toluene, 16 vol. % ethanol, 10 vol. % n-butanol and 4 vol. % deionized $H_2O$.

In an atmosphere of low relative humidity, the silanized coquille is preheated to a temperature of 120° C., dipped in the prepared polyvinyl butyral solution, dried for 15 minutes at room temperature, and then dried for 20 minutes at 130° C. This application procedure is repeated 7 times until an adhesive bonding layer approximately 0.010 inches in thickness is provided on each surface of the glass coquille.

The adhesive-coated glass coquille produced as described is incorporated into a glass-plastic laminated lens utilizing a molding assembly such as described in Example 1 above. However, to avoid outgassing in the polyvinyl butyral adhesive bonding layers, which can occur at CR-39 ® curing temperatures under atmospheric pressure, the assembly is processed through a curing cycle under pressure in an autoclave. Curing follows substantially the same time/temperature profile as is utilized in Example 1; however, the pressure during curing is raised from atmospheric pressure to about 60 psi after the first 3 hours of curing, and to 80 psi after 4 hours of curing and for the remainder of the curing cycle.

After cooling, depressurization, and disassembly of the mold components, it is found that a defect-free curved glass-plastic laminated lens has been provided by this process. Although chemical interaction between the curing CR-39 ® resin and the polyvinyl butyral adhesive bonding layers results in hardening of the top 0.005 inches of each of the bonding layers, the underlying 0.005 inches of each bonding layer remains elastic, so that a laminate exhibiting good resistance to breakage upon thermal cycling is provided.

Of course the foregoing examples are merely illustrative of materials and techniques which may be used to provide curved photochromic laminated glass-plastic lenses as hereinabove described. Obviously, numerous variations and modifications may be resorted to in the manufacture of such lenses within the scope of the appended claims.

We claim:

1. A curved glass-plastic laminated lens comprising a plastic front surface layer, a photochromic glass core, and a plastic back surface layer, each plastic surface layer being bonded to the glass core by an adhesive bonding layer, wherein:
   (a) the ratio of the thickness of the plastic front surface layer to the thickness of the plastic back surface layer is in the range of about 1:8 to 8:1 at all peripheral portions of the lens within about 2 lens thicknesses of the lens edge;
   (b) the plastic front and back surface layers are composed of a polymerized allyl diglycol carbonate resin; and
   (c) each adhesive bonding layer is composed of an adhesive having a tensile strength of at least about 4000 psi and a shear strength of at least about 2000 psi, and comprises a region at least about 0.002 inches in thickness wherein the elastic modulus of the adhesive does not exceed about 10,000 psi.

2. A curved laminated lens in accordance with claim 1 wherein the thickness of the glass core does not exceed about 0.025 inches.

3. A curved laminated lens in accordance with claim 2 wherein the thickness of the glass core is in the range of about 0.010–0.020 inches.

4. A curved laminated lens in accordance with claim 1 wherein the ratio of the thickness of the plastic front surface layer to the thickness of the plastic back surface layer is in the range of 1:8 to 1:1.

5. A curved laminated lens in accordance with claim 1 wherein the adhesive bonding layer comprises a region at least 0.005 inches in thickness wherein the elastic modulus does not exceed 10,000 psi.

6. A curved laminated lens in accordance with claim 1 wherein the adhesive bonding layer is composed of a polyurethane adhesive.

7. A curved laminated lens in accordance with claim 1 wherein the adhesive bonding layer is composed of a polyvinyl butyral adhesive.

8. A curved laminated lens in accordance with claim 1 which has a front and back surface curvature in the range of 6–8 diopters.

* * * * *